(12) United States Patent
Kevenaar et al.

(10) Patent No.: US 8,959,364 B2
(45) Date of Patent: Feb. 17, 2015

(54) METHOD AND SYSTEM FOR VERIFYING THE IDENTITY OF AN INDIVIDUAL BY EMPLOYING BIOMETRIC DATA FEATURES ASSOCIATED WITH THE INDIVIDUAL

(75) Inventors: Thomas Andreas Maria Kevenaar, Sterksel (NL); Aweke Negash Lemma, Eindhoven (NL)

(73) Assignee: Genkey Netherlands B.V., Eindhoven (NL)

( * ) Notice: Subject to any disclaimer, the term of this patent is extended or adjusted under 35 U.S.C. 154(b) by 0 days.

(21) Appl. No.: 13/142,751

(22) PCT Filed: Dec. 28, 2009

(86) PCT No.: PCT/NL2009/000271
§ 371 (c)(1),
(2), (4) Date: Jul. 21, 2011

(87) PCT Pub. No.: WO2010/080020
PCT Pub. Date: Jul. 15, 2010

(65) Prior Publication Data
US 2011/0271120 A1    Nov. 3, 2011

(30) Foreign Application Priority Data
Jan. 9, 2009    (NL) ..................................... 1036400

(51) Int. Cl.
G06F 21/00    (2013.01)
H04L 9/32    (2006.01)
G06F 21/32    (2013.01)

(52) U.S. Cl.
CPC .............. *H04L 9/3231* (2013.01); *G06F 21/32* (2013.01)
USPC ......................................... 713/189; 713/186

(58) Field of Classification Search
USPC ................................................. 713/186, 189
See application file for complete search history.

(56) References Cited

U.S. PATENT DOCUMENTS 5,956,409 A * 9/1999 Chan et al. ...................... 380/54
6,085,322 A * 7/2000 Romney et al. ............... 713/176

(Continued)

FOREIGN PATENT DOCUMENTS

WO    WO 2007/008789 A2    1/2007

OTHER PUBLICATIONS

International Search Report released by the European patent Office on Jun. 6, 2010 for PCT/NL2009/000271.

*Primary Examiner* — Taghi Arani
*Assistant Examiner* — Ali Shayanfar
(74) *Attorney, Agent, or Firm* — Smith Gambrell & Russell, LLP

(57) ABSTRACT

The invention relates to a method for verifying the identity of an individual by employing biometric data features associated with the individual, which method provides privacy of said biometric data features, comprising at least the steps of: a) for enrollment purposes deriving a first biometric template from at least a first set of first biometric data features associated with said individual, and b) for identity verifying purposes deriving a further biometric template from at least a further set of said first biometric data features associated with said individual, and c) comparing said further biometric template with said first biometric template. The invention also relates to a system for verifying the identity of an individual by employing biometric data features associated with the individual, which system at least comprises: an enrollment means and a verifying means, wherein said enrollment means are arranged in deriving a first biometric template data, said first biometric template data being secret and associated with a first set of first biometric data features of said individual, and in receiving a further set of first biometric data features of said individual, and in deriving a further biometric template data associated with said further set of first biometric data, and wherein said verifying means are arranged in comparing the first biometric template data with the further biometric template data to check for correspondence, wherein the identity of the individual is verified if correspondence exists.

8 Claims, 5 Drawing Sheets

(56) References Cited

U.S. PATENT DOCUMENTS

Figure 1A:
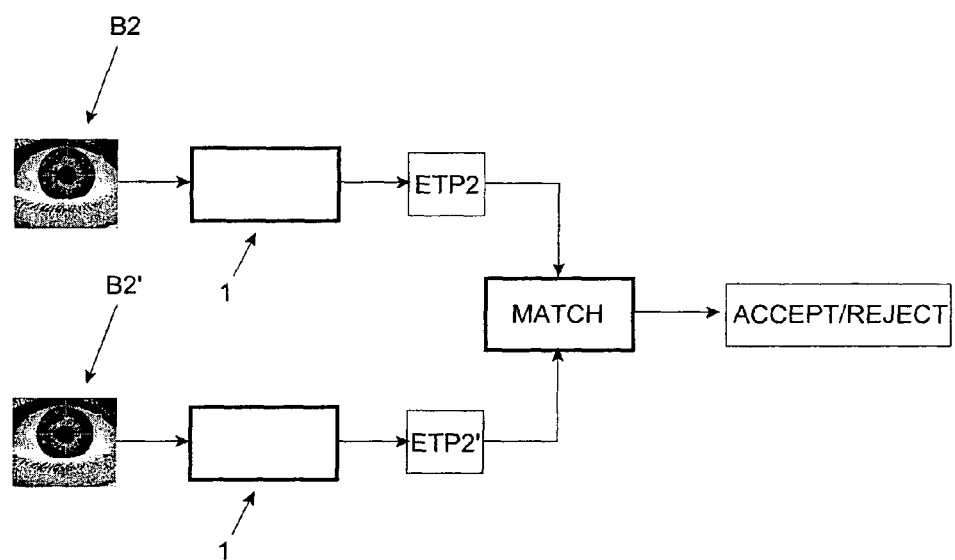

| | | | |
|---|---|---|---|
| 6,208,746 B1 * | 3/2001 | Musgrave | 382/100 |
| 6,317,834 B1 | 11/2001 | Gennaro et al. | |
| 6,363,485 B1 | 3/2002 | Adams et al. | |
| 7,844,827 B1 * | 11/2010 | Itoi | 713/186 |
| 8,046,589 B2 * | 10/2011 | Akkermans et al. | 713/186 |
| 8,078,885 B2 * | 12/2011 | Jobmann | 713/186 |
| 2004/0139329 A1 * | 7/2004 | Abdallah et al. | 713/182 |
| 2005/0154924 A1 * | 7/2005 | Scheidt et al. | 713/202 |
| 2008/0039140 A1 * | 2/2008 | Morris et al. | 455/558 |
| 2008/0091833 A1 * | 4/2008 | Pizano | 709/229 |
| 2009/0183008 A1 * | 7/2009 | Jobmann | 713/186 |

* cited by examiner

METHOD AND SYSTEM FOR VERIFYING THE IDENTITY OF AN INDIVIDUAL BY EMPLOYING BIOMETRIC DATA FEATURES ASSOCIATED WITH THE INDIVIDUAL

CLAIM OF PRIORITY

This application is the National Stage filing under 35 U.S.C. 371 of International Patent Application No. PCT/NL2009/000271 filed on Dec. 28, 2009, which claims priority from Netherlands Application No. 1036400 filed on Jan. 9, 2009, all of which are incorporated by reference herein in their entirety.

The invention relates to a method for verifying the identity of an individual by employing biometric data features associated with the individual, which method provides privacy of said biometric data features, comprising at least the steps of:
a) for enrolment purposes deriving a first biometric template from at least a first set of first biometric data features associated with said individual, and
b) for identity verifying purposes deriving a further biometric template from at least a further set of said first biometric data features associated with said individual, and
c) comparing said further biometric template with said first biometric template.

The invention also relates to a system for verifying the identity of an individual by employing biometric data features associated with the individual, which system at least comprises: an enrolment means and a verifying means, wherein said enrolment means are arranged in deriving a first biometric template data, said first biometric template data being secret and associated with a first set of first biometric data features of said individual, and in receiving a further set of first biometric data features of said individual, and in deriving a further biometric template data associated with said further set of first biometric data, and wherein said verifying means are arranged in comparing the first biometric template data with the further biometric template data to check for correspondence, wherein the identity of the individual is verified if correspondence exists.

Authentication of physical objects may be used in many applications, such as conditional access to secure buildings or conditional access to digital data (e.g. stored in a computer or removable storage media), or for identification purposes (e.g. for charging an identified individual for a particular activity). Every human being has a unique, set of biometric data features, such as voice, fingerprints, iris, retina, face, etc. These are normally referred to as biometric modalities. The use of biometrics is, to an ever-increasing extent, considered to be a better alternative to traditional identification means, such as passwords and PIN-codes and, indeed, biometric information (data features) is increasingly used to verify and authenticate a person's identity in an ever-growing number of applications and situations.

In order to be able to perform an authentication, a biometric system must store biometric information. This information takes the form of biometric templates which are, for example, stored on personal tokens such as smart cards or in central databases during enrolment and compared with a live measurement during authentication. Typically, the storage of biometric information is governed by a trust model, whereby a user receives assurances that the information as provided will only be used for specific purposes and that abuse will be prevented by a security regime for the data.

Unfortunately, while in theory this should provide a complete solution that addresses all concerns from citizens and the privacy community, in practice every security regime becomes vulnerable when deployed on a large scale, and widespread use inevitably leads to insider abuse and outside attacks, e.g. by hackers. It will be apparent that biometric applications are a tempting target for identity thieves, so traditional biometric systems have protected biometric templates by storing them in encrypted form. However, in this situation the encryption and decryption keys are not under control of the individual but they are under control of the system owner who thus has access to personal biometric information.

In order to circumvent these problems, in the past years so-called template protection methods also known, as biometric encryption (BE) methods were developed to protect the privacy of the biometric information (templates) stored in biometric systems. The essence of these methods is to derive a robust identifier from a biometric measurement which is then used in a standard cryptographic authentication protocol. The biometric authentication of an individual is successful when the cryptographic authentication protocol is successful.

An important property of any biometric system is the recognition accuracy which is expressed in terms of the False Accept Rate (FAR) and the False Reject Rate (FRR). The FAR is the probability that the biometric system will incorrectly accept an unauthorized user. Likewise, the FRR is the probability that an authorized user is rejected. Therefore, lower FAR and FRR values indicate a better recognition performance of the biometric system. To enhance the recognition accuracy, most biometric systems use more than one piece of biometric information combined with multiple types of processing, an approach known in general as multibiometrics. In this text we will use the term multi-template systems when for a given individual more than one biometric template is stored.

As a first example, a biometric system could use both the information of the fingerprint of the right index finger and combine it with an iris scan of the right eye. This is commonly known as a multi-modal approach because more than one modality is used in the biometric authentication process.

As a second example, a biometric system could combine several representations of the same modality: a face recognition system could deploy the geometry of a face (such as the distance between the eyes, the angle between the tip of the nose and the two eyes, etc.) and combine it with the skin texture at certain locations in the face.

The problem with these known BE methods is that not all representations of biometric information can easily be used in these BE methods. In many cases it takes a significant effort to apply BE methods to a new biometric modality or a new representation of a biometric modality.

The invention aims to provide a method and system according to the above mentioned preambles, which allow for a private multi-template setting (such as multi-modal or multi-representation) wherein multiple different representations of biometric information can be used, even when only one of the used biometric information (data features) requires or uses a BE method.

According to the invention the method is characterized by the step of encrypting at least a second biometric template associated with a set of second biometric data features of said individual using the first biometric template being derived.

Likewise the system according to the invention is characterized in that it further comprises encrypting/decrypting means arranged for encrypting at least second biometric template data associated with a set of second biometric data features of said individual using the first biometric template.

Thus herewith only one of the used biometric information (data features) requires or uses a BE method, whereas a secured identity verification method can be performed.

More in particular the method according to a further aspect of the invention is characterized by the step of deriving an encrypting data key from said first biometric template for encrypting said at least second biometric template. This encryption key will be derived or calculated each time an individual is to be enrolled into the biometric identification system and will therefore be only used temporarily. As the encryption key being derived is not stored or otherwise maintained by the system, a high level of security is obtained, which is required and demanded for presently known biometric identification systems (and methods).

According to another aspect of the identification method according to the invention, method comprises the further step of using, for identity verifying purposes, said further biometric template associated with said further set of said first biometric data features for decrypting said encrypted second biometric template.

Thereto said step is further characterized by the step of deriving a further decrypting data key from said further biometric template for decrypting said encrypted second biometric template.

Hence by using a further data key, being temporarily derived from the biometric template used for verifying purposes, which data key is used for decrypting the previously encrypted second biometric template (associated with a set of second biometric data features) a quick, but more over safe and fraud proof verification method is obtained for establishing the true identity of the individual.

Thereto according to the invention a further biometric template is being derived from at least a further set of said second biometric data features associated with said individual, and said further biometric template is being compared with said decrypted second biometric template.

Likewise the system according to the invention is characterized in that said encrypting/decrypting means are arranged in deriving an encrypting data key from said first biometric template data for encrypting said at least second biometric template data. As the encryption key being derived is not stored or otherwise maintained by the system, but temporarily used to encrypt other biometric data features, a high level of security is obtained, which is required and demanded for presently known biometric identification systems.

Likewise said encrypting/decrypting means are according to the invention arranged for decrypting said encrypted second biometric template data using said further biometric template data associated with said further set of first biometric data, wherein a decrypting data key is derived from said further biometric template data for decrypting said encrypted second biometric template data.

For verifying the identity of the individual according to the invention said enrolment means are arranged in receiving a further set of second biometric data features of said individual, and in deriving a further biometric template data associated with said further set of second biometric data, and said verifying means are arranged in comparing the decrypted, second biometric template data with the further biometric template data associated with said further set of second biometric data to check for correspondence, wherein the identity of the individual is verified if correspondence exists.

Figure 1B:
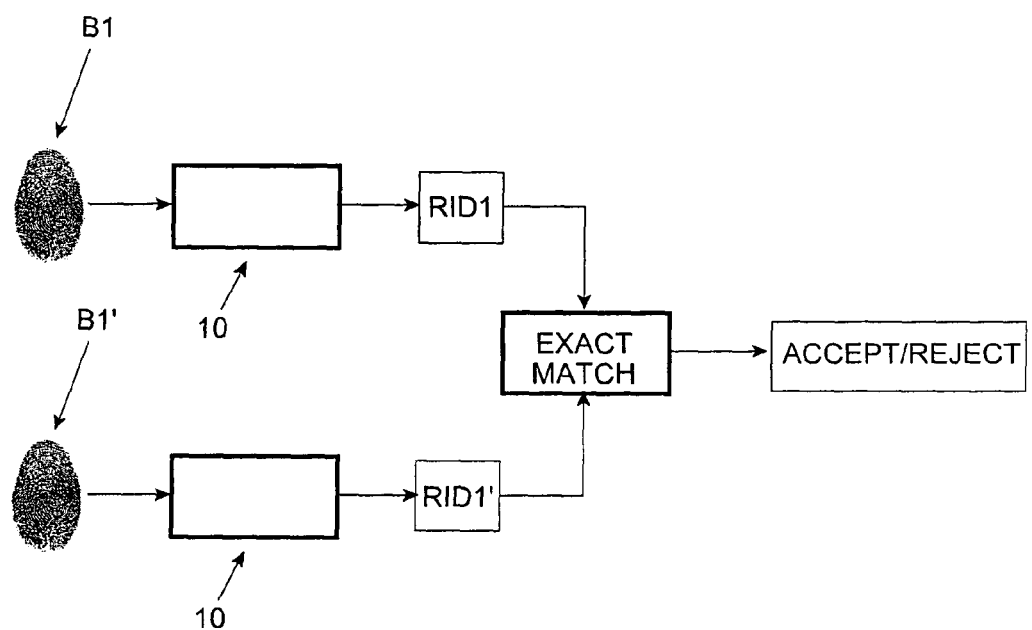
Figure 1C:
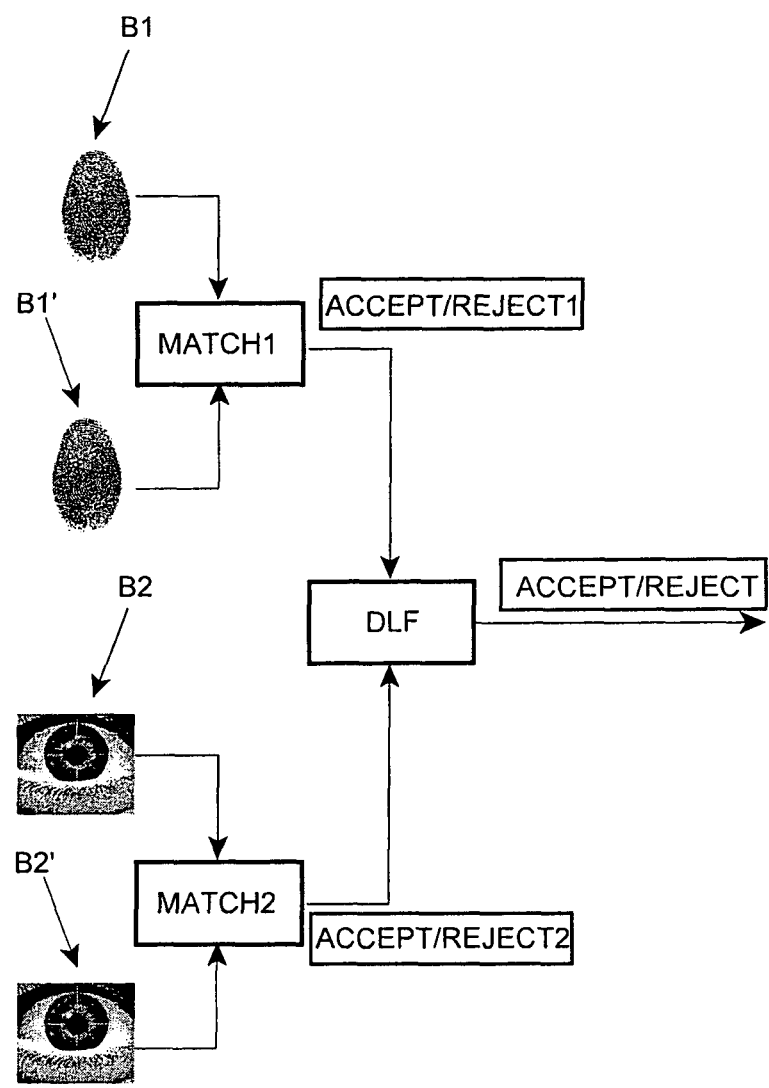
Figure 2:
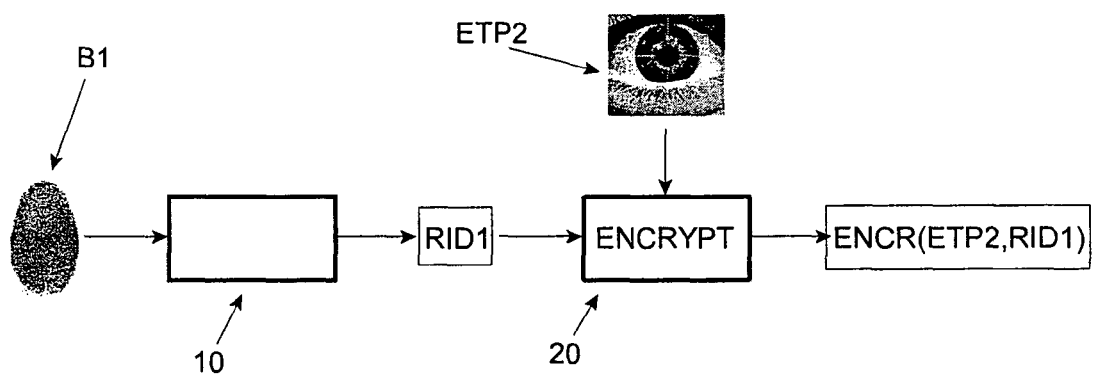
Figure 3:
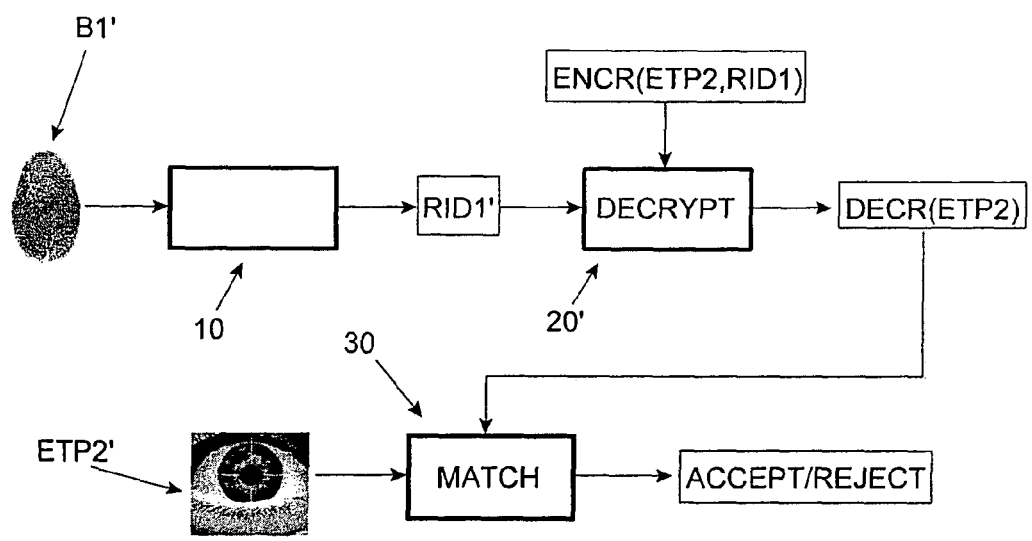

The invention will now be explained in more detail with reference to a drawing, which drawing shows in:

FIG. 1a a system for verifying the identity of an individual by employing one set of biometric data features according to a traditional non-private state of the art approach;

FIG. 1b a system for verifying the identity of an individual by employing one set of biometric data features according to a BE approach;

FIG. 1c a system for verifying the identity of an individual by employing multiple sets of different biometric data features according to the state of the art;

FIG. 2 a first aspect of a system for verifying the identity of an individual by employing biometric data features according to the invention;

FIG. 3 a further aspect of the system of FIG. 2.

Although clearly it is possible to use more than two modalities or representations or sets of different biometric data features (finger print, iris scan, facial scan, voice scan, etc.), for the sake of clarity the invention will now be described below with reference to the use of two types of sets of biometric data features (finger print and iris scan). However it is to be understood, that the figurative description below should not be interpreted as a limitation of the invention.

Also for the sake of clarity identical parts of the invention are denoted with the same reference numerals. In FIGS. 1a, 1b and 1c examples are shown of a system according to the state of the art. In general, biometric verification techniques are composed of an enrolment procedure and a verification procedure.

In FIG. 1a an identity verification procedure is disclosed using one type of biometric information, for example the image of a right iris of an individual, which biometric information (or data features) are denoted as data B2 according to a traditional non-private state of the art approach.

Likewise, in FIG. 1b a similar procedure is disclosed using another type of biometric information, for example the image of a right index finger print of an individual, which biometric information (or data features) are denoted as data B1 according to a BE approach.

In this example, it is presumed that an individual wishes to enroll as a member of a chain of casinos that uses biometric identification (using e.g. the right iris B2 in FIG. 1a) for access control. For enrolment purposes the biometric data B2 is transformed, for example using traditional non-private techniques (denoted with reference numeral 1), into a biometric data template ETP2, which biometric template data ETP2 is stored on suitable storage means (not depicted) for future use.

Similarly, one could use a' BE approach combined with the right index finger according to FIG. 1b. For enrolment purposes the biometric data B1 is transformed using BE techniques (denoted with reference numeral 10), into a Robust Identifier RID1, which identifier RID1 is stored on suitable storage means (not depicted) for future use.

For verification purposes (hence, when the enrolled individual wishes to obtain access in a casino), said individual presents his right iris or index finger in order to obtain biometric data B2' or B1', or respectively. Again said biometric data B2' (or B1') is transformed, in a similar-way as during the enrolment procedure, into a further biometric template data ETP2' (or RID1'). Both the biometric template data ETP2 (or RID1) and the biometric template data ETP2' (or RID1') are presented (or offered) to a matching function MATCH (or EXACT MATCH, in FIG. 1b), which outputs an ACCEPT or REJECT decision based on the comparison between ETP2 and ETP2' (or RID1 and RID1').

In a similar known way an enrolment/verification procedure can be set up using two different types of biometric data B1 (right index finger print) and B2 (iris scan) as shown in FIG. 1c using two matching functions MATCH 1 and MATCH2 and a Decision Level Fusion function DLF, which DLF function combines the outputs of MATCH1 and MATCH2 to generate an overall ACCEPT/REJECT output.

The method and system according to the invention will now be explained with reference to FIGS. 2 and 3.

Similar as explained above, for enrolment purposes, two pieces of biometric information are used, which are denoted with B1 and B2 where, for example, B1 is the image of a right index finger and B2 is the image of the right iris. Alternatively, B1 is an image containing the geometric information of a face while B2 is an image containing high-definition information of a certain part of the face. The data B1 can be privacy protected using BE techniques (denoted with reference numeral 10) such that from B1 a robust identifier RID1 can be generated.

Furthermore, using traditional non-private techniques, the iris scan B2 is transformed into biometric template data ETP2 (note that in some biometric applications the raw biometric measurement data is stored in which case B2 equals ETP2) and that for these type of template a biometric matching function MATCH 30 is available which outputs ACCEPT or REJECT.

According to the invention the method is characterized by the step of encrypting the biometric template data ETP2 (associated with the iris scan data B2) with the use of the data RID1 (derived from the biometric information data B1). For this encryption step an encryption function 20 ENCRYPT is used, that encrypts data M with an encryption key K and outputs encrypted data ENCR(M, K).

Also according to the invention the method is characterized by the step of decrypting the previously encrypted biometric template data ETP2 (associated with the iris scan data B2) with the use of another data information RID1' (associated with the biometric, information data B1'). According to the invention the decrypting step uses a decryption function 20' DECRYPT that decrypts an encrypted (with former key K and encryption function ENCRYPT) message M using a key K'.

In the context of the present invention this leads to the following enrolment procedure of the two pieces of biometric information B1 and B2 (see also FIG. 2 for a graphical representation).

First, a first set of first biometric data features B1 is measured and transformed into the robust identifier RID1 using a suitable transforming function 10. Likewise a first set of second biometric data features B2 (iris scan) is measured and transformed in biometric template data ETP2. The robust identifier RID1 is used as an encryption data key for encrypting the biometric template data ETP2 using an ENCRYPT-function 20, which function 20 outputs encrypted data information ENCR(ETP2, RID1). Encrypted data information ENCR(ETP2, RID1) is to be stored in suitable storage means of the biometric system for future use, whereas the data information RID1 is removed and/or deleted from the system.

Likewise the verification/authentication procedure is as follows (see FIG. 3 for a graphical representation).

The individual offers his right index finger and his iris in order to obtain a further set of first biometric data features B1' and a further set of second biometric data features B2'. Likewise the biometric data features B1' are transformed into a further robust identifier RID1' using the transforming function 10. Also the second biometric data features B2' are transformed in further biometric template data ETP2'.

For decrypting the previously stored encrypted data information ENCR(ETP2, RID1) is retrieved and fed to a DECRYPT-function 20' (as well as the data RID1'). The DECRYPT-function 20' outputs decrypted data DECR(ETP2), which is fed to a matching function MATCH 30 (see FIG. 3), where it is compared with the further biometric template data ETP2'. If the matching function 30 outputs an ACCEPT decision, then the identity verification/authentication is accepted otherwise it is rejected.

Note that with this approach the privacy of both B1 and B2 (and hence ETP2) is protected. B1 is privacy protected because BE is applied to this information (using the function 10). ETP2 (and hence B2) is protected because it is encrypted and the data RID1 is not available in the system and can only be regenerated if B1' is available.

Further, note that this approach effectively implements AND fusion on B1 and B2 as follows. If B1 and B1' are not similar enough, data (biometric template data) RID1 will not be equal to data RID1'. Thus the decryption of data ENCR (ETP2, RID1) using data RID1' will lead to meaningless information and will result in a REJECT output of MATCH function 30. On the other hand, if RID1=RID1', then still MATCH function 30 can output REJECT if B2 and B2' are not similar enough resulting in an overall REJECT. Thus, the overall output will be a positive authentication only if RID1=RID1' (meaning B1 and B1' are similar enough) and MATCH function 30 results in an ACCEPT output (i.e. iris scans B2 and B2' are similar enough).

The benefits of this approach are as follows. First, while B1 is protected using BE techniques, ETP2 is protected using a traditional encryption scheme but the encryption key RID1 is not stored in the biometric system and is thus not accessible by even the system owner. The encryption key RID1 is available in the biometric system only temporarily when B1 is available and thus, access to ETP2 is completely under control of its rightful owner.

Second, ETP2 can be protected in a very efficient way without integrating it closely with a BE system saving significant integration effort: in a way the protection of template data ETP2 is bootstrapped on the protection of B1. Moreover, to compare data DECR(ETP2) and data ETP2' the matching function 30 can be used. This significantly reduces the implementation effort of privacy protected multi-template biometric systems and enhances the recognition performance.

Third, biometric template data ETP2 can be protected without any knowledge of the inner workings of transforming B2 into ETP2 (and B2' into ETP2') or MATCH function 30 thus protecting proprietary techniques used by the vendor of this functionality. Fourth, the approach allows to privatize existing multi-template biometric database if for one of the modalities a BE implementation is available.

Although not explicitly mentioned above, many approaches that derive RID1 from a biometric measurement B1 require extra side information. This is not important for the basic principle of the encrypting/decrypting method according to the invention, but it means that not only ENCR (ETP2, RID1) data is stored in the system but also said side information. This naturally leads to a number storage options for these two pieces of information.

Many biometric systems use personal storage media to store biometric information. These can take the form of a smart card, an RF tag etc. Clearly, both the additional side information and the ENCR(ETP2, RID1) data can be stored on this storage medium and used during verification. Alternative, both pieces of information can be stored in a central database. A third possibility is that the extra side information is stored on a possible token while the ENCR(ETP2, RID1) data is stored in a central database. This has the advantage that both the storage medium and the biometric data features B1 are required to get access to the ETP2 data.

The method according to the invention effectively implements AND fusion on B1 and B2 where the privacy of B2 is bootstrapped on B1. If more than one biometric template, say B2 and B3, would be bootstrapped on B1, for the fusion of B2 and B3, any type fusion known in the art can be used such as feature level fusion or score level fusion.

The invention claimed is:

1. A method for verifying the identity of an individual by employing biometric data features associated with the individual in a biometric storage device, which method provides privacy of said biometric data features, comprising the steps of:
   a) enrolment, including deriving a first biometric template from at least a first set of first biometric data features associated with said individual and providing privacy of said first biometric data features, and
   b) verifying identity, including deriving a further first biometric template from at least a further set of said first biometric data features associated with said individual, and
   c) comparing said further first biometric template with said first biometric template;
   d) encrypting at least a second biometric template associated with a set of second biometric data features of said individual using the first biometric template being derived in step a) and in addition step b) comprises the steps of:
   e) using said further first biometric template associated with said further set of said first biometric data features for decrypting said encrypted second biometric template being derived in step d) and
   f) deriving a further second biometric template from at least a further set of said second biometric data features associated with said individual, and
   g) comparing said further second biometric template with said decrypted second biometric template.

2. Method according to claim 1, characterized by the step of
   h) deriving an encrypting data key from said first biometric template for encrypting said at least second biometric template.

3. Method according to claim 1, wherein step e) further comprises the step of
   i) deriving a decrypting data key from said further biometric template for decrypting said encrypted second biometric template.

4. Method according to claim 1, characterized by the step of j) storing said at least one encrypted second biometric template.

5. System for verifying the identity of an individual by employing biometric data features associated with the individual maintained on non-transitory computer readable storage medium, which system comprises:
   an enrolment computer, and
   a verifying computer,
   wherein said enrolment computer is arranged in receiving a first set of first biometric data features being presented by said individual to said enrolment means and, in deriving a first biometric template data, said first biometric template data being associated with a said first set of first biometric data features of said individual and providing privacy of said first biometric data features, and in receiving a further set of first biometric data features of said individual, and in deriving a further biometric template data associated with said further set of first biometric data, and
   wherein said verifying computer is arranged in comparing the first biometric template data with the further biometric template data to check for correspondence, wherein the identity of the individual is verified if correspondence between said first and said further biometric template data exists, wherein said enrolment computer is arranged in receiving a first set of second biometric data features being presented by said individual to said enrolment computer and, in deriving a second biometric template data, said second biometric template data being associated with said first set of second biometric data features of said individual and providing privacy of said second biometric data features and wherein the system further comprises encrypting/decrypting module arranged for encrypting at least said second biometric template data associated with said first set of second biometric data features of said individual using the first biometric template and wherein, during verification, said encrypting/decrypting module are further arranged for decrypting said encrypted second biometric template data using said further first biometric template data associated with said further set of first biometric data and said enrolment computer are arranged in receiving a further set of second biometric data features of said individual, and in deriving a further second biometric template data associated with said further set of second biometric data, and said verifying computer is arranged in comparing the decrypted second biometric template data with the further second biometric template data associated with said further set of second biometric data to check for correspondence, wherein the identity of the individual is verified if correspondence exists.

6. System according to claim 5, characterized in that said encrypting/decrypting module is arranged in deriving an encrypting data key from said first biometric template data for encrypting said at least second biometric template data.

7. System according to claim 5, characterized in that said encrypting/decrypting module is arranged in deriving a decrypting data key from said further biometric template data for decrypting said encrypted second biometric template data.

8. System according to claim 5, characterized in that said encrypting/decrypting module is arranged in storing said at least one encrypted second biometric template data at said storage means.

* * * * *